US 8,587,719 B2

(12) United States Patent
Zhang

(10) Patent No.: US 8,587,719 B2
(45) Date of Patent: Nov. 19, 2013

(54) EAR-HANGING MINIATURE VIDEO CAMERA

(75) Inventor: Xianzhi Zhang, Shenzhen (CN)

(73) Assignee: Shenzhen AEE Technology Co., Ltd., Shenzhen (CN)

(*) Notice: Subject to any disclaimer, the term of this patent is extended or adjusted under 35 U.S.C. 154(b) by 267 days.

(21) Appl. No.: 13/084,765

(22) Filed: Apr. 12, 2011

(65) Prior Publication Data
US 2011/0254964 A1    Oct. 20, 2011

(30) Foreign Application Priority Data

Apr. 19, 2010 (CN) .......................... 2010 1 0148896
Nov. 2, 2010 (CN) .......................... 2010 2 0587556

(51) Int. Cl.
H04N 5/225  (2006.01)
H04N 5/232  (2006.01)
H04N 5/228  (2006.01)
H04M 1/00   (2006.01)

(52) U.S. Cl.
USPC .................... 348/376; 348/207.1; 348/211.2; 348/211.14; 348/222.1; 348/373; 455/550.1; 455/556.1; 455/575.1; 455/575.6

(58) Field of Classification Search
None
See application file for complete search history.

(56) References Cited

U.S. PATENT DOCUMENTS

| | | | |
|---|---|---|---|
| 7,570,301 B2 * | 8/2009 | Gilor .............................. | 348/373 |
| 2002/0081982 A1 * | 6/2002 | Schwartz et al. ............... | 455/90 |
| 2002/0120979 A1 * | 9/2002 | Prendergast ..................... | 2/422 |
| 2003/0025828 A1 * | 2/2003 | Ramonowski et al. ....... | 348/376 |
| 2005/0174470 A1 * | 8/2005 | Yamasaki ...................... | 348/345 |
| 2006/0030360 A1 * | 2/2006 | Yeh ................................ | 455/557 |
| 2006/0209013 A1 * | 9/2006 | Fengels ......................... | 345/156 |
| 2008/0170838 A1 * | 7/2008 | Teetzel et al. ................. | 386/118 |
| 2008/0266448 A1 * | 10/2008 | Reiner et al. .................. | 348/376 |
| 2009/0247245 A1 * | 10/2009 | Strawn et al. .............. | 455/575.2 |
| 2009/0262205 A1 * | 10/2009 | Smith ......................... | 348/211.4 |
| 2010/0020229 A1 * | 1/2010 | Hershey et al. ............... | 348/376 |
| 2010/0039493 A1 * | 2/2010 | Chao et al. ................. | 348/14.02 |
| 2010/0118158 A1 * | 5/2010 | Boland et al. .............. | 348/211.2 |
| 2010/0245585 A1 * | 9/2010 | Fisher et al. .................. | 348/164 |

(Continued)

FOREIGN PATENT DOCUMENTS

CN      1991574 A    7/2007
CN      101129071 A  2/2008

Primary Examiner — Michael Osinski
(74) Attorney, Agent, or Firm — Troutman Sanders LLP

(57) ABSTRACT

The present invention relates to the field of video camera and provides an ear-hanging miniature video camera. The ear-hanging miniature video camera comprises a video camera head, a control unit for controlling the operation of the video camera head, a storage unit for storing the information obtained by the video camera head and a shell for accommodating the video camera head, the control unit and the storage unit. The video camera whose main body consists of the video camera head, the control unit, the storage unit and the shell also comprises an ear-hook detachably connected with the shell and adapted to the shape of a human ear for fixing the main body of the video camera to a human ear, and a Bluetooth communication unit connected with the control unit and used in conjunction with the mobile terminal, said Bluetooth communication unit comprising a earpiece module and a microphone module so as to receive the audio signals transferred from the outside to the mobile terminal and output the audio signals at the user side through the mobile terminal. The ear-hanging miniature video camera of the invention can achieve the communication with the outside, so it's much more convenient for the users to use this ear-hanging miniature video camera.

10 Claims, 4 Drawing Sheets

(56) References Cited

U.S. PATENT DOCUMENTS

| | | | |
|---|---|---|---|
| 2011/0157365 A1* | 6/2011 | Sato | 348/158 |
| 2012/0287284 A1* | 11/2012 | Jacobsen et al. | 348/158 |
| 2013/0002813 A1* | 1/2013 | Vaught et al. | 348/43 |
| 2013/0090062 A1* | 4/2013 | Tricoukes et al. | 455/41.2 |

* cited by examiner

EAR-HANGING MINIATURE VIDEO CAMERA

TECHNICAL FIELD

The invention relates to the field of video camera technology, in particular to an ear-hanging miniature video camera.

BACKGROUND ART

The miniature video camera is more and more widely used because of its small size. At present, there exist video cameras with means for fixing the camera head to a human's head. (for example, buckle fastener, ear-hook, etc.) This kind of video cameras are generally used in outdoor activities, such as cycling, climbing, etc. However, this kind of video cameras have the following defects: the users can not communicate with the outside in real-time during outdoor activities, which is not very convenient for the users.

SUMMARY OF THE INVENTION

The main objective of the invention is to provide an ear-hanging miniature video camera that achieves real-time communication between the ear-hanging miniature video camera (during its operation) and the outside so that it's more convenient for the users to use the ear-hanging miniature video camera.

The ear-hanging miniature video camera comprises a video camera head, a control unit for controlling the operation of the video camera head, a storage unit for storing the information obtained by the video camera head and a shell for accommodating the video camera head, the control unit and the storage unit. The video camera's main body comprises the video camera head, the control unit, the storage unit and the shell. The video camera also comprises:

an ear-hook detachably connected with the shell and adapted to the shape of a human ear for fixing the main body of the video camera to human ear;

a Bluetooth communication unit connected with the control unit and used in conjunction with the mobile terminal, the Bluetooth communication unit comprising an earpiece module and a microphone module so as to receive the audio signals transferred from the outside to the mobile terminal and output the audio signals at the client side through the mobile terminal.

Preferably, the ear-hook comprises a rigid enclosure and a clamping arm connected with the rigid enclosure, the clamping arm is flexible and the lower segment of the clamping arm is provided with a lobe-hook detachably or fixedly connected with the clamping arm and with the shape and size adapted to the lobe of the human ear; and the middle segment of the clamping arm being adapted to the shape and size of the back of the helix of the human ear, and the upper segment of the clamping arm comprising an arc-shaped portion, and being provided with a connecting link extending from the back of the helix to an ear canal, and the end of the connecting link detachably connected with the miniature video camera.

Preferably, the ear-hook also comprises a earplug body located at the end of the connecting link, the earplug body with the size adapted to the ear canal being aligned with the ear canal, and the head of the earplug body being an inverted cone.

Preferably, the ear-hook also comprises a earplug house made of thin and flexible materials; the earplug house detachably enclosing the earplug body and being adapted to a variety of human ears of a variety of sizes.

Preferably, the control unit is provided with a key module that is arranged in the ear-hook, so as to control On/Off of the Bluetooth communication unit.

Preferably, the ear-hanging miniature video camera can also comprise:

a recording unit, respectively connected with the microphone module and the control unit, so as to obtain the audio information from the external environment through the microphone module according to the control commands of the control unit;

a storage unit, connected with the video camera head and the recording unit, so as to store the information obtained by the video camera head or the recording unit.

Preferably, the control unit comprises a voice operated switch for controlling the On and Off of the video camera head according to the outside audio information.

Preferably, the ear-hanging miniature video camera also comprises an USB data interface connected with the storage unit and adapted to the external data processing equipment for achieving data interaction between the video camera and the external data processing equipment and charging the video camera.

Preferably, the USB data interface has a AV OUT unit, the AV OUT unit connected with the circuits of the video camera head for outputting the information obtained by the video camera head.

Preferably, the control unit comprises a cryptographic module connected with the storage unit for encrypting or decrypting the files in the storage unit.

Preferably, the ear-hanging miniature video camera also comprises a timing unit that is provided with a RTC clock module for timing the video recording or recording.

Preferably, the ear-hanging miniature video camera also comprises a power detection unit arranged in the power supply circuit of the video camera for detecting the electric energy.

The ear-hanging miniature video camera of the invention is provided with an ear-hook that can connect the main body of the video camera to a human ear, and a Bluetooth communication unit that can communicate with the outside in real-time, so that it's more convenient for the users to use the ear-hanging miniature video camera. What's more, the ear-hanging miniature video camera of the invention also comprises a recording unit and a timing unit that expand the functions of the miniature video camera.

Figure 1:
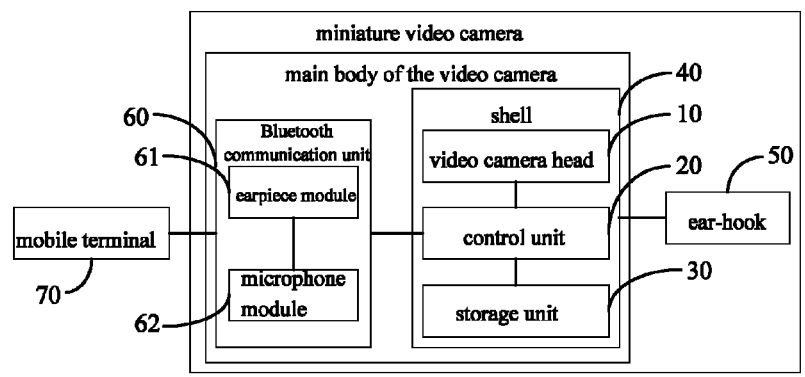
FIG. 1 is a structure diagram of the ear-hanging miniature video camera in one implementation of the present invention.

Referring to the drawings, the realization of the purpose, functions and features as well as advantages of the invention will be further described.

DETAILED DESCRIPTION OF THE PREFERRED EMBODIMENTS

It should be understood that the embodiments described here are only for the explanation of the invention rather than limiting the invention.

As shown in FIG. 1, the ear-hanging miniature video camera of the invention includes a video camera head 10, a control unit 20 for controlling the operation of the video camera head 10, a storage unit 30 for storing the information obtained by the video camera head 10 and a shell 40 for accommodating the video camera head 10, the control unit 20 and the storage unit 30. The ear-hanging miniature video camera of the invention's main body comprising the video camera head 10, the control unit 20, the storage unit 30 and the shell 40. The ear-hanging miniature video camera of the invention also comprises:

an ear-hook 50 detachably connected with the shell 40 and adapted with human ear in the shape for fixing the main body of the video camera to human ear. The video camera head 10 is positioned in the front end of the shell 40 whose back end is arranged with the ear-hook 50 that is detachably connected with the shell 40 in order to adjust the shooting perspective of the video camera head 10. In one embodiment, the ear-hook 50 is connected with the shell 40 by way of a hole/shaft so that the shell 40 can rotate relatively around the ear-hook 50, thereby adjusting the shooting perspective of the video camera head 10.

a Bluetooth communication unit 60 (that is also installed in the main body of the above video camera, referring to FIG. 1) connected with the control unit 20 and used in conjunction with the mobile terminal 70 which is provided with a earpiece module 61 and a microphone module 62 so as to receive the audio signals transferred from the outside to the mobile terminal 70 and output the audio signals at the client side through the mobile terminal 70. Blue Tooth is a wireless data transfer protocol that is generally used in mobile phones and other communication equipments for wireless transmission of data files, and also can be used to receive and send wirelessly audio signals, which is more convenient for the users. For example, it is not necessary for drivers to hold the mobile phone to communicate with the outside while driving, if the Bluetooth headset is available. The ear-hanging miniature video camera of the invention is generally used in climbing or cycling or other outdoor activities, which means if the users want to communicate with the outside without using their hands, what they need to do is to use the Bluetooth communication unit 60 in conjunction with the mobile terminal 70, thereby greatly facilitating the users.

By using the Bluetooth communication unit, the ear-hanging miniature video camera can also transfer the data files (such as, pictures, AVI format files, audio files, etc.) to the outside so that the convenience of the ear-hanging miniature video camera for transferring the data files is improved. In one specific example, if the users need to record the information about the surrounding environment and send them to the outside via the miniature video camera when they are climbing or cycling, the Bluetooth communication unit 60 in the ear-hanging miniature video camera of the invention can be used to communicate with the external data processing equipment so that the captured video files or audio files are transferred to the outside.

Figure 2:
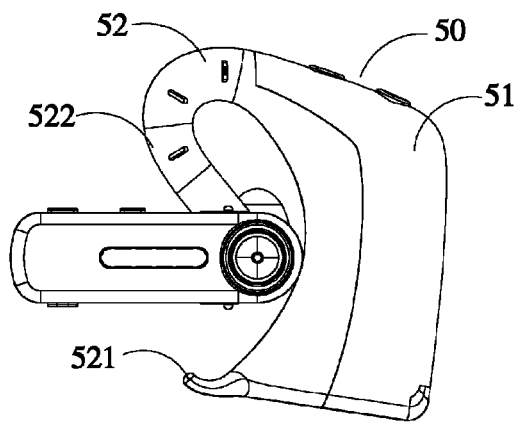
FIG. 2 is a front view of the ear-hanging miniature video camera in one implementation of the present invention.

There are several ways to control the video camera head 10 and the Bluetooth communication unit 60, including using the control circuit in the above control unit 20. FIG. 2 is the structure of the control unit 20 in one embodiment of the present invention. The control unit 20 can be a microprocessor and can send out control commands to control each part, such as turning on or off the video camera head 10 and the Bluetooth communication unit 60. There are many methods for the control unit 20 to control On or Off of the video camera head 10 or the Bluetooth communication unit 60, such as the arrangement of different control modules. In one embodiment, the control unit 20 comprises a voice operated switch 21 that is positioned in the control circuit of the video camera head 10 and can control On or Off of the video camera head 10 according to the volume of the external environment. For example, when the surrounding environment needs to be shot, the users utter the sound to cause the voice operated switch to be powered on, thereby starting the video camera head 10. In the ear-hanging miniature video camera of the invention, the convenience of video shooting is improved because the video camera head 10 can be controlled via the sound of the users.

Referring to FIG. 2, In one embodiment, the ear-hook 50 comprises a rigid enclosure 51 and a clamping arm 52 connected with the rigid enclosure 51, the clamping arm 52 is flexible and the lower segment of the clamping arm 52 is provided with a lobe-hook 521 detachably or fixedly connected with the clamping arm 52 and with the shape and size adapted to the lobe of the human ear; and the middle segment of the clamping arm 52 adapted to the shape and size of the back of the helix of the human ear, and the upper segment of the clamping arm 52 has an arc-shaped portion and is provided with a connecting link 522 extending from the back of the helix to an ear canal, and the end of the connecting link 522 detachably connected with the miniature video camera.

The rigid enclosure 51 can be two plastic shells with a reciprocal fastening, and it can fix the clamping arm 52. Moreover, the rigid enclosure 51 can also allow a cable to pass through it, or set some keys on it to facilitate the operation. The clamping arm 52 can be made of rubber or silicone, because of the lobe-hook 521, it can increase the stability by hooking the ear lobe when attached to the human ear.

Because the clamping arm 52 is flexible, the connecting link 522 can open apart and rebound automatically, thus the connecting link 522 can clamp the helix, and increase the stability of the connection between the ear hook 50 and the root of ear.

Figure 3:
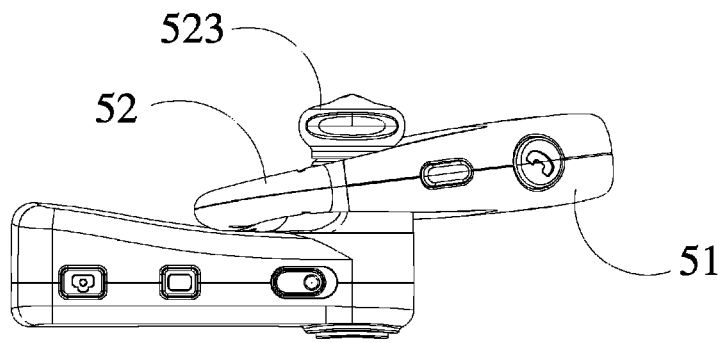
FIG. 3 is a top view of the ear-hanging miniature video camera in one implementation of the present invention.

Referring to FIG. 3, in one embodiment, the ear-hook 50 described above comprises a earplug body 523 located at the end of the connecting link 522, the earplug body 523 with the size adapted to the ear canal is aligned with the ear canal, and the head of the earplug body is an inverted cone. The stability of connection can be farther increased by inserting the earplug body 523 into the ear canal when the ear hook 50 is connected with the root of ear. In a specific embodiment, the earplug body 523 is hollow and with an earpiece in it.

The ear-hook 50 described above also comprises a earplug house, the earplug house can be made of rubber or silicone for the wall of the earplug house need to be thin and the material is flexible and with a relatively large friction coefficient, so that the earplug body 523 can be more tight connected with the ear. The earplug house detachably encloses the earplug body 523 and is adapted to a variety of human ears of a variety of sizes.

Figure 4:
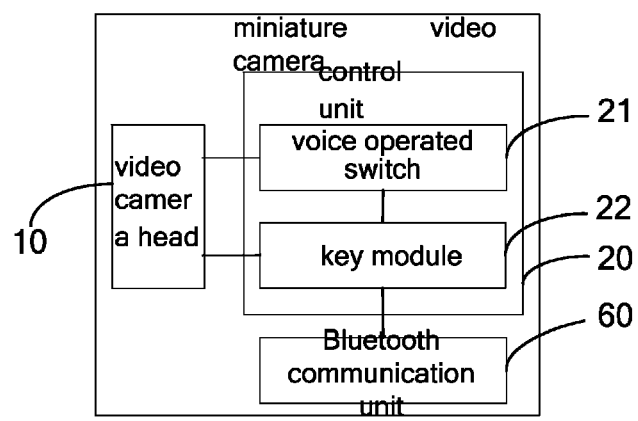
FIG. 4 is a structure diagram of the control unit in one embodiment of the present invention.
Figure 5:
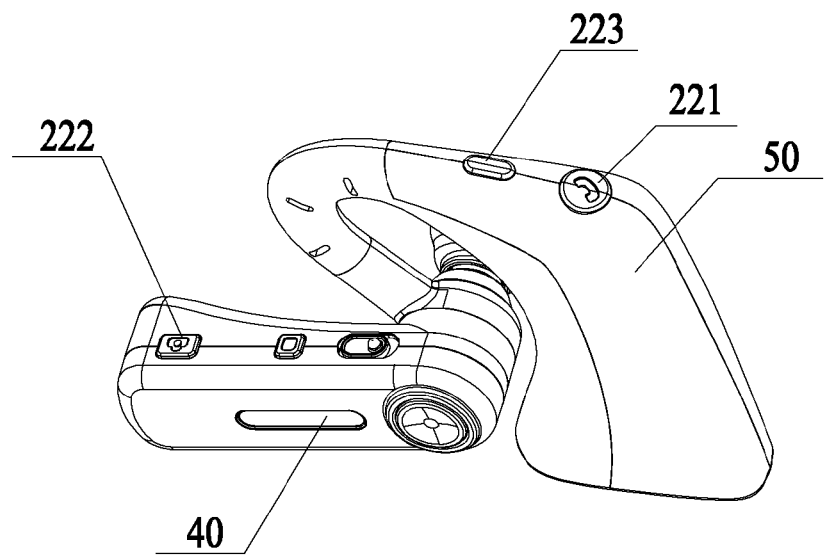
FIG. 5 is a schematic diagram of the spatial structure of the ear-hanging miniature video camera in one embodiment of the present invention.

Referring to FIGS. 4 and 5, a key module 22 can be included in the control unit 20 to turn on or off the Bluetooth communication unit 60, which means the Bluetooth communication unit 60 is started or terminated. In one embodiment, the key module 22 comprises a contact button 221 that is positioned in the middle of the rigid enclosure 51 of the ear-hook 50, by pressing which the Bluetooth communication unit 60 is started or terminated.

The control unit 20 can also control the switch of the video camera head 10 between photos taking and video recording by pressing the button. For example, in one embodiment, the above key module 22 is provided with a starting button of photo taking 222, through which the video camera head 10 can enter the working state of taking photos.

When the above Bluetooth communication unit 60 is used to transfer the data files, the communication switch button 223 in the key module 22 is adopted to switch communication mode and the Bluetooth communication unit 60 is adopted to extract the files in the storage unit 30 so that the files are sent to the outside.

Figure 6:
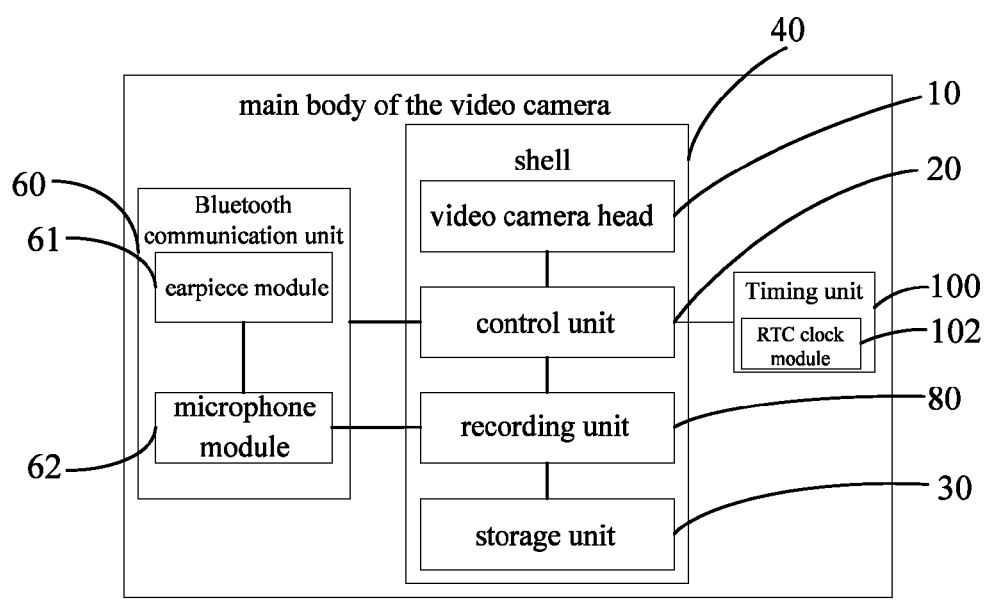
FIG. 6 is a structure diagram of the ear-hanging miniature video camera in another embodiment of the above implementation.

FIG. 6 is another embodiment of the ear-hanging miniature video camera of the invention, which is put forward based on the above embodiment. In the embodiment, the ear-hanging miniature video camera can also comprise a recording unit 80 that is respectively connected with the control unit 20 and the microphone module 62 so as to obtain the audio information from the external environment through the microphone module 62 according to the control commands of the control unit 20 and achieve information storage in the storage unit 30. Turning on or off of the recording unit 80 is similarly achieved through the control unit 20. For example, in one embodiment, the recording unit 80 can be individually turned on by the keys in the key module 22 in the control unit 20 to make a recording; in another embodiment, the recording unit 80 can also be controlled by the voice operated switch in the control circuit. Due to the inclusion of the recording unit 80, the ear-hanging miniature video camera has diverse functions, which means the functions of video or audio recording or photos taking can be selected so that the video camera can be used on many occasions.

The above storage unit 30 can be respectively connected with the video camera head 10 and the recording unit 80 for storing the information obtained by the video camera head 10 or the recording unit 80. In one embodiment, the storage unit 30 is provided with FLASH memory which can store the video and picture information obtained by the video camera head 10 and the audio information obtained by the recording unit 80.

Figure 7:
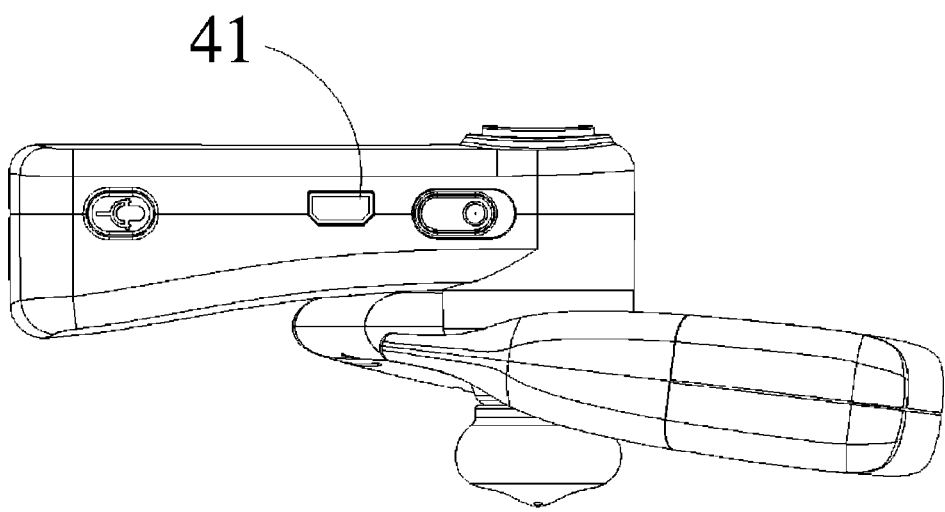
FIG. 7 is a bottom view of the ear-hanging miniature video camera in one implementation of the present invention.

The information stored in the storage unit 30 can be outputted to (for example) the computer and other external data processing equipment through the miniature USB data interface 41 (referring to FIG. 7) located at one side of the shell 30. Likewise, the data information in the external data processing equipment can also be inputted to the storage unit 30 through the USB data interface 41.

The USB data interface 40 described above may also have a AV OUT unit. The AV OUT unit may be connected with the circuits of the video camera head 10 for outputting the media obtained by the video camera head 10. By using an external video processing device (such as computer, television, etc.) connected with USB data interface 40, the user can watch the media by operating the button module 22 when the media obtained by the video camera head need to be outputted.

The above control unit 20 can also comprise a cryptographic module for encrypting or decrypting audio, video or picture folders in the storage unit 30 so that files storage security is increased.

The other role of the USB data interface 41 is to charge. In one embodiment, the power module in the ear-hanging miniature video camera comprises rechargeable lithium-ion battery which can get electric power from the external data processing equipment or power source by connecting the USB data interface 41 to the external data processing equipment or power source so that the charging is completed.

In order to avoid the loss of stored files or damages to the video camera caused by the extreme environment, the control circuit of the ear-hanging miniature video camera of the invention may be provided with an environmental monitoring unit in which a temperature and humidity sensor is installed for detecting the temperature and/or humidity of the working environments and sending the detected temperature and/or humidity to the control unit 20 to control the working states of other parts. For example, in one embodiment, the operating temperature of the video camera can be set to −10° C. to 60° C. in advance via the control unit 20, which indicates that the video camera will stop working if the temperature is beyond the scope. In the practical application, when the temperature sensor in the environmental monitoring unit detects that the actual temperature is above or close to working temperature limit, the control unit 20 will cut off the operating circuit so that the video camera will stop operating, thereby avoiding the damage of the video camera caused by abnormal environmental temperature. In another embodiment, the operating humidity of the video camera can be set to 15~85% RH in advance via the control unit 20, which indicates that the video camera will stop working if the humidity is beyond the scope. The operating humidity can be detected by the humidity sensor in the environmental monitoring unit.

Preferably, the above ear-hanging miniature video camera can also comprise a timing unit 100 and a power detection unit, in which the timing unit 100 is provided with RTC (Real-Time Clock) clock module 102 for timing video recording or recording and the power detection unit is arranged in the power supply circuit of the video camera for detecting the electric energy for the display.

Furthermore, the above ear-hanging miniature video camera can also comprise a storage space detection unit for detecting the capacity of the storage unit 30, thereby facilitating the operation of the video camera.

It's easier for those skilled in the art to achieve the layout of the above timing unit, power detection unit and storage space detection unit which will not be discussed here.

The above is only the preferred embodiment of the invention rather than limiting the scope of the patent of the present invention. Any equivalent structure transformation made according to the specifications and the drawings of the invention or direct or indirect use of the invention in other relevant technical fields are all similarly included in the claims of the invention.

The invention claimed is:

1. An ear-hanging miniature video camera, comprising a video camera head, a control unit for controlling the operation of the video camera head, a storage unit for storing information obtained by the video camera head and a shell for accommodating the video camera head, the control unit and the storage unit, said video camera's main body comprising the video camera head, the control unit, the storage unit and the shell, said video camera also comprising:

an ear-hook, detachably connected with the shell for fixing the main body of the video camera to a human ear; wherein the ear-hook comprises a rigid enclosure and a clamping arm connected with the rigid enclosure, the clamping arm is flexible and a lower segment of the clamping arm is provided with a lobe-hook detachably or fixedly connected with the clamping arm for hooking a lobe of the human ear; a middle segment of the clamping arm is connected to one side of the rigid enclosure facing the main body of the video camera and is configured for hooking a back of the helix of the human ear, and an upper segment of the clamping arm comprises an arc-shaped portion, and is provided with a connecting link extending from the back of the helix to an ear canal, and an end of the connecting link is detachably connected with the miniature video camera; and a Bluetooth communication unit connected with the control unit and used in conjunction with a mobile terminal, said Bluetooth communication unit comprising an earpiece module and a microphone module so as to receive audio signals transferred from outside to the mobile terminal and output the audio signals at a client side through the mobile terminal.

2. The ear-hanging miniature video camera according to claim 1, wherein the ear-hook further comprises an earplug body located at the end of the connecting link, the earplug body corresponds to the ear canal with the head of the earplug body being an inverted cone.

3. The ear-hanging miniature video camera according to claim 2, wherein the ear-hook further comprises an earplug house made of thin and flexible materials, the earplug house detachably encloses the earplug body.

4. The ear-hanging miniature video camera according to claim 1, wherein the control unit comprises a key module in the ear-hook, so as to control On and Off states of the Bluetooth communication unit.

5. The ear-hanging miniature video camera according to claim 4, further comprising a recording unit, respectively connected with the microphone module and the control unit, so as to obtain audio information from external environment through the microphone module according to control commands of the control unit; a storage unit, connected with the video camera head and the recording unit, so as to store information obtained by the video camera head or the recording unit.

6. The ear-hanging miniature video camera according to claim 5, wherein the control unit comprises a voice operated switch for controlling On and Off states of the video camera head according to the outside audio information.

7. The ear-hanging miniature video camera according to claim 6, further comprising an USB data interface connected with the storage unit and an external data processing equipment for achieving data interaction between the video camera and the external data processing equipment and charging the video camera.

8. The ear-hanging miniature video camera according to claim 7, wherein the USB data interface comprises an AV OUT unit, the AV OUT unit being connected with circuits of the video camera head for outputting information obtained by the video camera head.

9. The ear-hanging miniature video camera according to claim 1, wherein the control unit further comprises a cryptographic module connected with the storage unit for encrypting or decrypting files in the storage unit.

10. The ear-hanging miniature video camera according to claim 9, further comprising a timing unit comprising an RTC clock module for timing the video recording or sound recording.

* * * * *